(12) United States Patent
Eby

(10) Patent No.: US 6,938,960 B1
(45) Date of Patent: Sep. 6, 2005

(54) TOP-LOADING CONTAINER AND COVER ASSEMBLY FOR COLLECTING, STORING, HANDLING, AND TRANSPORTING BULK MATERIALS

(76) Inventor: Caleb Eby, 12675 Mercersburg Rd., Greencastle, PA (US) 17225

( * ) Notice: Subject to any disclaimer, the term of this patent is extended or adjusted under 35 U.S.C. 154(b) by 0 days.

(21) Appl. No.: 10/608,662

(22) Filed: Jun. 30, 2003

(51) Int. Cl.$^7$ .................................................. B60P 7/02
(52) U.S. Cl. ................ 298/23 C; 298/17 R; 298/23 R; 296/100.08; 296/100.1
(58) Field of Search ........................... 298/23 R, 23 C, 298/17 R; 414/329, 407, 491; 220/1.5, 211, 220/263, 810; 296/100.06, 100.08, 100.1

(56) References Cited

U.S. PATENT DOCUMENTS

| | | | |
|---|---|---|---|
| 3,173,563 A | | 3/1965 | Finch |
| 3,311,255 A | * | 3/1967 | Loveless ..................... 220/324 |
| 3,572,811 A | | 3/1971 | Keeston |
| 3,886,719 A | | 6/1975 | Garrison et al. |
| 3,913,969 A | | 10/1975 | Hoch |
| 4,015,520 A | | 4/1977 | Anderson |
| 4,200,330 A | | 4/1980 | Scott |
| 4,378,188 A | | 3/1983 | Hardwick |
| 4,487,007 A | * | 12/1984 | Mullet et al. ................ 56/16.6 |
| 4,767,152 A | | 8/1988 | Stluka et al. |
| 4,907,402 A | | 3/1990 | Pakosh |
| 5,058,956 A | | 10/1991 | Godwin, Sr. |
| 5,078,560 A | | 1/1992 | Patrick et al. |
| 5,362,198 A | | 11/1994 | Patrick |
| 5,498,066 A | | 3/1996 | Cuthbertson et al. |
| 5,542,734 A | | 8/1996 | Burchett et al. |
| 5,913,561 A | | 6/1999 | Alcorn |
| 5,953,892 A | | 9/1999 | Albicker et al. |
| 6,097,425 A | | 8/2000 | Behnke et al. |
| 6,227,608 B1 | | 5/2001 | Hoyne |
| 6,402,223 B2 | | 6/2002 | Ser et al. |
| 6,439,668 B1 | * | 8/2002 | Hagenbuch et al. .......... 298/18 |

* cited by examiner

Primary Examiner—Stephen Gordon

(57) ABSTRACT

A top-loading container for collecting, storing, and transporting bulk material comprises a sidewall defining a load-carrying receptacle and includes an upwardly facing top peripheral edge section having an open top. A cover portion is mounted to freely move independently of the top peripheral edge section to uncover and cover the open top of the load-carrying receptacle. And an actuating mechanism is effective to lift the cover portion upwardly and freely out of contact with and away from the top peripheral edge section. The cover portion and actuating mechanism are each pivotally mounted to the container sidewall outside of the receptacle and at pivot locations spaced downwardly from the top peripheral edge section for freely moving the cover portion between an open top position out of contact with the top peripheral edge section and a closed top position when in contact with the top peripheral edge section.

41 Claims, 11 Drawing Sheets

TOP-LOADING CONTAINER AND COVER ASSEMBLY FOR COLLECTING, STORING, HANDLING, AND TRANSPORTING BULK MATERIALS

FIELD OF THE INVENTION

This invention pertains generally to open-top containers for collecting, storing, handling, and/or transporting any kind of bulk material that may be used in manufacturing, construction, agricultural, and/or environmental applications. More particularly, the invention relates to a cover assembly for any open-top container that may be used as a stationary storage facility, or on a mobile base in combination with a vehicular unit such as a railroad car, truck, tractor, trailer, and wagon for transporting bulk materials from one site to another in an efficient, economical, and environmentally safe manner.

BACKGROUND OF THE INVENTION

When open-top containers are used to transport bulk material along highways and railroad tracks, the material can be blown out of the car. Rain and contaminants can enter the car directly spoiling the contents if they are not waste products or, if they are waste products, adding to the liquid contained in the car which may present a leaking or odor problem. Sabotage, theft and spontaneous combustion (a special concern when transporting bulk combustibles such as coal which produces coal dust) are other problems that appear depending on the nature of the material transported. One common solution is simply to cover the open car with a tarpaulin, but tarpaulins are frequently lost or break free in transit. These conditions allow loss of the material being carried and, moreover, tarpaulins require personnel time to install and remove them. U.S. Pat. No. 5,058,956 shows an improved hydraulically actuated tarp extension and retraction system for a truck.

Many types of known top-loading containers having cover members hinged to the upwardly facing top peripheral edge section of an open-top and are actuated by extendable mechanisms such as hydraulically driven piston means as shown in U.S. Pat. Nos. 3,913,969; 4,200,330; 4,767,152; 5,498,066; and 6,227,608. Most involve the use of relatively complex linkage and/or hinge arrangements to effect the desired opening and closing of the open-top cover member. For example, U.S. Pat. No. 5,542,734 discloses a top cover assembly for coal carrying vehicles wherein a cover member is removably, pivotally connected to the upper peripheral edge sections of opposed planar sidewalls, and includes hydraulic piston cylinders that enable the top cover member to be pivotally opened from either of two opposed upper edge sections. U.S. Pat. No. 6,402,223 discloses a gear, chain, and drive shaft assembly for opening and closing a pair of roof doors over an open-top container, which may be placed on a special vehicle or a train for transporting bulk materials.

U.S. Pat. No. 5,078,560 discloses a railway car transportation system in which top-loading containers having removably mounted top covers that are moved independently of the container that is removably mounted on a mobile flatbed railway car. Unlike the cover assembly of this invention, a forklift is used to individually remove each of the top cover members from each container, and each container from the flatbed car.

U.S. Pat. No. 5,913,561 discloses a top cover that is hinged to a vertical support rack, operates independently from a roll-off container, and pivotally moves between open and closed top positions when a pair of telescoping support struts respectively move between extended and retracted positions. U.S. Pat. Nos. 4,378,188 and 5,362,198 each discloses a top cover that is removed from a container by support arms pivotally mounted to a vertical support rack, and pivotally moves between open and closed top positions when a hydraulically driven piston respectively moves between extended and retracted positions.

In contrast, the top cover of the invention pivotally moves between open and closed top positions with respect to a container, but the invented cover actuating means respectively moves oppositely between retracted and extended positions to open and close the top cover oppositely from the '561, '188, and '198 structures. In addition, unlike the top cover assembly of the invention, the '188 and '198 cover actuating mechanisms are part of a dumping assembly that empties the container while the top cover is held in an open position.

Blowing harvested crops into the front of a forage wagon is known. For example, U.S. Pat. No. 3,173,563 discloses a forage handling vehicle having a top plate inclined rearwardly that prevents forage delivered by a harvester to the trailer through a front top opening from being blown over the top, back edge section of the trailer. U.S. Pat. No. 3,572,811 discloses a forage wagon having a hinged roof that serves to limit loss of forage from the top of the wagon during travel and when the roof is in its elevated position, serves to enlarge the open portion to facilitate loading.

U.S. Pat. Nos. 3,886,719 and 4,015,520 exemplify a particular type of stack-forming machine featuring a front end loading forage wagon having a bulk material pressing top cover mechanism that periodically presses down on accumulated crop to increase the load density to form a self-sustaining stack that is discharged from the rear of the wagon.

As shown in U.S. Pat. No. 6,097,425, crop handling equipment used in harvesting grain and agricultural forage are well known and in widespread use. The harvesting operation from which the invention has been developed is shown in FIG. 1 and specifically relates to the control of overloading (i.e., transferring) the harvested crop from the harvesting machine to the transporting vehicle while harvesting. Combine harvester 2 has a cutting mechanism 4 for mowing a field area 6 to be harvested, and then separates and cleans grain from the mowed harvested product. After intermediate storage in a grain tank of combine 2, discharge tube 8 discharges the grain to a transporting vehicle, which includes a field tractor 10 and a trailer 12. Care must be taken in this type of operation so as to avoid undesired loss of the harvested crop during the overloading process. U.S. Pat. Nos. 4,907,402 and 5,953,892 show typical machines for loading harvested crops into an agricultural wagon or trailer.

All silage systems center around the forage harvester that either picks up the swathed crop or direct cuts the crop for themselves. The most common type of forage harvester uses a cylinder cutter-head that chops the forage into short uniform lengths, which are then blown through a spout to the box or receptacle of a truck, wagon, or trailer that is being used to transport the forage to a discharge or unloading location. Known wagons are front end and side loading with the harvester traveling in the front or along the side of the wagon to direct a continuous flow of forage into the open-top receptacle.

In the prior art operation of FIG. 1, combine 2 includes a device for electro-mechanically monitoring existing harvest conditions to effect overloading of the product into trailer 12. For the efficiency of the use and the impact force of combine 2, it is important that combine 2 not be maintained stationary during the time period of overloading of the threshed and cleaned grain to the transporting vehicle 10, 12, but to perform the overloading process during the parallel travel of the harvesting machine and transporting vehicle. Unlike the grain harvesting combine 2, a forage harvester must necessarily be overloaded during travel of the units because there is so much product to be overloaded that an intermediate storage is no longer possible.

For avoiding a loss of the products to be overloaded from combine 2, or because of an unfavorable loading of the transporting vehicle, the drivers of combine 2 and transporting vehicle 10, 12 must control the overloading process, which is a difficult task. For the drivers must drive forward and at the same time control overloading rearwardly or laterally while coordinating opposite sides of their respective machinery to guarantee optimal loading as well as to prevent collisions of the vehicles with one another. The drivers' respective cabins include control instruments having various switches and keys, and image screens 14 on which several graphic indicators are represented. Each driver is thus informed about the speed, number of revolutions of the motor and working organs, adjustments of the machine, service intervals, control tips, working parameters and others in graphic and/or alpha numerical indicators. A monitoring camera 16 arranged on discharge tube 8 and connected with combine 2 monitors the overloading process. Monitoring camera 16a is electrically connected to control combine 2 so that it travels along the edge of the crop stand in an optimal manner.

The output end of discharge tube 8 is directly over or located a very short distance from a traditional, open-top trailer 12 as shown. The harvested crop load is piled up to about 18 or 24 inches above the sides of trailer 12 before it starts roll off onto the ground. Once the trailer is thus full, both the harvester and transport vehicle stop while the harvesting machine blows all of the harvested material out of the harvester to clear crop from its inlet to its discharge end. So while the harvester is stopped to empty itself out, it is in an unproductive period of down time. Further time loss occurs because of the method of exchanging an empty transporting trailer for a full trailer 12. For an empty trailer must stand by until it can be pulled into position along side the harvesting machine once the full trailer is pulled away to travel to an unloading destination. Full trailer capacity is not available because travel time for the full trailer from the field naturally expels air entrained during the harvesting process thereby causing the load to settle. In short, the existing process loses down time for the harvester, and use of the full capacity of the trailer transporting the crop load.

Handling harvested grain requires considerable care. The grain is valuable, so waste is to be prevented. On the other hand, it is also important for economic reasons to transport the grain from the field to a desired destination as quickly as practicable. So grain is normally transported from the farm to elevators or mills in large trucks, the bodies of which are up to 45 feet long and have open tops to facilitate loading. Normally, these trucks traverse the grain fields alongside harvesting machines, such as combines, with the discharge chutes of the harvesting machines directed into the open tops of the truck bodies. Maneuverability of such long structures is particularly difficult at the end of the rows when the equipment must turn completely around for the next cutting pass of the harvesting equipment. Moreover, while open tops are essential for loading, they are quite detrimental on the highway, since wind passing over the open top of a truck body will blow a substantial amount of the grain out of the truck body. Furthermore, rain can enter the truck body and destroy much of the grain. To avoid these problems, most operators of grain trucks place large tarpaulins over the open tops of their truck bodies.

In recent years, it has become common to mount large forage boxes on the back chasses of trucks. The trucks are driven into the fields to directly receive forage cut by choppers and similar harvesting machinery. Alternately, the forage boxes can be mounted on large trailers, which are pulled by tractors. Forage boxes often include apron chains that propel the forage material horizontally along a bed to an unloading gate. Like known grain handling equipment, the forage related equipment works very well. Also like the grain handling equipment, it is very expensive, especially if it is idle for much of the year.

In an ideal situation, forage boxes could also be used to handle harvested grain. That situation would eliminate the prior need for expensive separate equipment for hauling forage and grain. However, the prior art believes that double use of prior forage boxes is not feasible because of the structural configuration of the existing forage boxes, a large amount of grain loaded in a forage boxes would uncontrollably spill onto the ground immediately upon opening the unloading gate. The monetary loss of the spilled grain, or of the time required to pick it up, would be intolerable. Further, even if the problems associated with the initial surge of spilling grain were solved, it would be very difficult to control the unloading of the rest of the grain from the forage box.

None of these foregoing known assemblies show the invented actuating mechanism with a double pivot arrangement for moving a cover member between an open and closed position over the open top of a receptacle, and the invented structural control mechanisms that limit bulk material load loss, give load and environmental protection, and control load density to solve multiple problems in collecting, storing, handling, and transporting bulk materials. For these reasons, the invented top-loading container assembly and its various structural configurations that increase the efficiency of collecting, handling, and transporting bulk materials as compared to known assemblies and methods particularly in the crop harvesting process that use existing harvesting techniques and equipment.

PURPOSE OF THE INVENTION

The primary purpose of the invention is to provide a container having a unique actuating mechanism for moving a top cover between open and closed positions with respect to the open top of the container having multiple uses for collecting and transporting bulk materials such as refuse, waste material that may be hazardous, coal, crops, forage, grain such as wheat, barley, corn and the like, wood chips as used in the paper industry or for making wood products such as particle board, and particulate materials of various kinds with the container either fixedly or removably disposed on a wagon, flat-bed vehicle, trailer, dump truck, semitrailer, or railroad car while preventing loss of bulk material during their environmentally safe transportation.

Another object of the invention is to provide a container for receiving bulk materials that are forcefully directed against the inside surface of the top cover when it is in an open position with substantially no loss of the bulk material over the top edge section of the container.

A further object of the invention is to provide a container disposed on a mobile chassis for specific use on an agricultural wagon, trailer, or truck for receiving, collecting, and transporting harvested crops from a field such as grain and forage to eliminate the need for having different types of equipment that are specifically adapted for a particular crop.

Yet another object of the invention is to provide a bulk material receiving, collecting, and storage container having a top cover assembly that is effective to compress bulk material using a unique actuating mechanism that forcefully closes a cover member upon bulk material wherein the cover member is independently, pivotally mounted at a location spaced from the top peripheral edge section of the container.

A particular object of the invention is to provide a top cover assembly that may be used to compress bulk material that is piled to a level that is above the top edge section of the container, and may be further piled against the inside surface of a top cover member that is in an open position.

A still further object of the invention is to provide a transportable storage container having four planar sidewalls into which a harvested field crop forcefully blows against the inside surface of the top cover to eliminate air from the harvested crop for maximizing the total load density and for efficiently handling and transporting it from the field to an unloading location where the material is to be discharged using a bottom conveyor system.

Another object of the invention is to provide an agricultural wagon or trailer having a container assembly for collecting the crop to increase its load density by eliminating air from the collected load when an actuating mechanism closes the cover member over the open top to compress the crop, and for transporting the crop of either grain or forage from the field to a discharge location.

Still another object of the invention is to provide an agricultural wagon having a unique top cover assembly with a structural configuration effective to provide a continuous, seamless exchange between a loaded wagon and an empty wagon without the necessity of stopping the vehicles in the field to thereby significantly enhance the efficiency of the harvesting process.

SUMMARY OF THE INVENTION

A top-loading container for collecting, storing, and transporting bulk material of the invention comprises sidewall means defining a load-carrying receptacle and including an upwardly facing top peripheral edge section having an open top. A cover portion is mounted to freely move independently of the top peripheral edge section to uncover and cover the open top of the load-carrying receptacle, and is connected to actuating means for lifting the cover portion upwardly and freely out of contact with and away from the top peripheral edge section. The cover portion and actuating means are each pivotally mounted to the sidewall means outside of the receptacle and at pivot locations downwardly spaced from the top peripheral edge section for freely moving the cover portion between an open top position out of contact with the top peripheral edge section and a closed top position when in contact with the top peripheral edge section.

In a specific embodiment, the cover portion includes a downwardly extending section having a distal end portion pivotally connected at a cover pivot location downwardly spaced from the top peripheral edge section, and the actuating means has first and second end sections with the first end section pivotally mounted to the downwardly extending section of the cover portion at an upper actuating pivot axis. The second end section is pivotally mounted at a lower actuating pivot axis that is spaced downwardly from the top peripheral edge section.

A feature of this embodiment is directed to the structure of the distal end portion of the downwardly extending section that includes at least one elongated connecting member, and the lower actuating pivot axis of the actuating means is spaced downwardly from the cover pivot location for the elongated connecting member. Another feature includes bracket means rigidly connected to a cover section of the cover portion, and at least one elongated connecting member rigidly connected at one end thereof to the bracket means. The elongated connecting member is pivotally connected at the other end thereof to a cover pivot axis disposed at the cover pivot location for the downwardly extending section, the upper actuating pivot axis is disposed at an intermediate location between the cover section and the cover pivot location, and the lower actuating pivot axis is spaced downwardly from the cover pivot location for the elongated connecting member. In a more specific feature, cover pivot location of the downwardly extending section is disposed in a first vertically disposed plane, and the lower actuating pivot axis is disposed in a second vertically disposed plane that is parallel to said first vertically disposed plane and laterally spaced outwardly from the sidewall means and the first vertically disposed plane.

In another feature of the invention, the actuating means is effective to move between an extended position and a retracted position wherein the cover portion is in the closed top position when the actuating means is in an extended position, and the cover portion is in an open top position when the cover actuating means is in a retracted position. More specifically, the actuating means includes hydraulically driven piston means to effect the movement between the extended and retracted positions. When the container is to be used for bulk materials that may blow or shake out of the receptacle, sealing means is disposed between the cover portion and the upwardly facing top peripheral edge section when the cover portion is in the closed top position.

A top-loading container for collecting, storing, and transporting bulk material of the invention comprises sidewall means, a bottom portion, and a cover portion. The sidewall means defines a load-carrying receptacle and includes an upwardly facing top peripheral edge section having an open top. Sidewall connecting means pivotally mounts the cover portion to the sidewall means at two pivot locations that are disposed outside of the receptacle. The sidewall connecting means is effective to freely move the cover portion independent of the top peripheral edge section between a closed top position and an open top position. The sidewall connecting means includes at least one connecting member and cover actuating means wherein the sidewall connecting means is fixedly mounted at one end thereof to the cover portion, and the connecting member is pivotally connected to the sidewall means at the other end of the sidewall connecting means at a first of the two pivot locations which are downwardly spaced from the peripheral edge section.

The cover actuating means includes an upper end section and a lower end section wherein the upper end section is pivotally mounted to the connecting member at an upper pivot axis. The lower end section is pivotally mounted to the sidewall means at a lower pivot axis disposed at a second of the two pivot locations. The lower pivot axis is spaced downwardly and outwardly from the cover pivot axis and outwardly from the sidewall means. The cover actuating means is effective to move between an extended position and a retracted position wherein the cover portion is in the closed top position when the cover actuating means is in an extended position, and the cover portion is in the open top position when the cover actuating means is in a retracted position. In a specific embodiment, the sidewall means includes a cover pivot location housing means that projects inwardly along an inside surface of the receptacle, and the first pivot location is laterally spaced inwardly with respect to an outside surface of the sidewall means within the cover pivot location housing means.

Another feature of the cover portion has an inner surface against which bulk material is disposed when piled to a level above the top peripheral edge section of the container, and the cover actuating means is effective to produce a leveraged force to the cover portion so as to be effective to compress the piled bulk material disposed in the receptacle when the cover actuating means moves the cover portion from an open position to a closed position. The cover portion has an outer apron section extending along an outer free distal edge of a top cover section which is mounted to the sidewall connecting means along a cover connecting edge section opposite the outer apron section that is inclined downwardly with respect to the top cover section at an angle sufficient to maintain the bulk material within the receptacle when the cover portion moves to a closed top position thereby causing the bulk material to move toward the outer free distal edge of the top cover section.

In a specific embodiment, the sidewall means includes a planar sidewall portion, the sidewall connecting means includes at least two connecting members laterally spaced along the planar sidewall portion, and the cover actuating means includes a cover actuation mechanism connected at one end thereof to each connecting member, and connected at the other end thereof to the lower pivot axis which is spaced outwardly from the planar sidewall portion. When the container has a plurality of planar sidewall portions, the sidewall connecting means is located along one of them.

A feature of the cover portion includes an inner cover surface that becomes separated a spaced distance from the top edge section to form a gap extending the length of the planar sidewall portion to which the cover is attached, and when the cover portion is in an open top position to receive bulk material into the receptacle. Barrier means is spaced inwardly from the planar sidewall portion for deflecting bulk material into the receptacle that may forcefully impinge against the inner cover surface from a location outside the container. The barrier means extends downwardly from the inner cover surface by an amount sufficient to preclude the discharge of bulk material through the spaced distance of the gap along the length of the planar sidewall portion when the bulk material is directed into the receptacle. In one embodiment, the barrier means is fixedly attached to and extending downwardly from the inner cover surface. In another embodiment, the barrier means is pivotally and slidably attached along an upper side edge thereof to the inner cover surface at a location which is inwardly spaced from the top edge section of the planar sidewall portion, and extends downwardly from the inner cover surface and is pivotally attached along a lower side edge thereof to the top edge section of planar sidewall portion. Here, hinge means pivotally couples the lower side edge of the barrier means to the top edge section of the sidewall portion.

The invention is also directed to a top-loading container assembly for collecting, storing, and transporting bulk materials that comprises a container removably disposed on mobile base means and having a movably disposed cover portion. The container includes sidewall means for defining a load-carrying receptacle, and includes an upwardly facing top peripheral edge section having an open top with the cover portion mounted to freely move independently of the top peripheral edge section to uncover and cover the open top of the load-carrying receptacle.

The base means removably supports the container so that it is movable from a transport position to a dumping position for discharging contents of the receptacle. Means connected to the base means is for lifting the cover portion upwardly and freely out of contact with and away from the top peripheral edge section of the container, and includes a downwardly extending section having a lower end pivotally connected to the base means at a cover pivot location downwardly spaced from the top peripheral edge section of the container. And actuating means includes first and second end sections with the first end section pivotally mounted to the downwardly extending section at an upper actuating pivot axis, and the second end section pivotally mounted to the base means at a lower actuating pivot axis for freely moving the lifting means for moving the cover portion between an open top position out of contact with the top peripheral edge section and a closed top position when in contact with the top peripheral edge section. The cover pivot location of the downwardly extending section is disposed in a first vertically disposed plane, and the lower actuating pivot axis of the actuating means is disposed in a second vertically disposed plane that is parallel to the first vertically disposed plane, and outwardly laterally spaced from both the sidewall means and the first vertically disposed plane.

In a specific embodiment of the assembly of the invention, an upper end of the downwardly extending section includes means for holding the cover portion while moving it upwardly and freely out of contact with and away from the top peripheral edge section of the container. A particular feature is directed to the downwardly extending section having a distal end portion pivotally connected to base means at the cover pivot location. And the first end section of the actuating means is pivotally mounted to the downwardly extending section at the upper actuating pivot axis, and the second end section of the actuating means is pivotally mounted at the lower actuating pivot axis. For this embodiment, the mobile base means includes a structural configuration for supporting the container on a wagon, flat-bed vehicle, trailer, dump truck, semitrailer, or railroad car.

More specifically, the downwardly extending section includes bracket means rigidly connected to a cover section of the cover portion, and at least one elongated connecting member rigidly connected at one end thereof to the bracket means for forming the distal end portion. The elongated connecting member is pivotally connected at the other end thereof to a cover pivot axis disposed at the cover pivot location. The upper actuating pivot axis of the actuating means is disposed at an intermediate location between the cover section and the cover pivot location, and the lower actuating pivot axis is spaced downwardly from the cover pivot location for the downwardly extending elongated connecting member.

The actuating means may include hydraulically operated piston means that is effective to move between an extended position and a retracted position wherein the cover portion is in the closed top position when the actuating means is in an extended position, and the cover portion is an open top position when the cover actuating means is in a retracted position. When necessary, sealing means is disposed between the cover portion and the upwardly facing top peripheral edge section for preventing passage of material in or out of the receptacle between the cover portion and the top peripheral edge section when the cover portion is in the closed top position.

The mobile top-loading container assembly of the invention is for collecting, storing, and transporting bulk material, and comprises a container that includes sidewall means, a bottom portion, and a cover portion, and is supported on mobile base means along the bottom portion thereof so that the container is movable from a bulk material collecting and transport position to an unloading position. The sidewall means defines a load-carrying receptacle and includes an upwardly facing top peripheral edge section having an open top. Sidewall connecting means pivotally mounts the cover portion to the sidewall means at two pivot locations disposed outside of the receptacle, and includes at least one connecting member and cover actuating means. The connecting means is effective to freely move the cover portion independently of the top peripheral edge section between a closed top position and an open top position, and is fixedly mounted at one end thereof to the cover portion.

The connecting member is pivotally connected to the sidewall means at the other end of the sidewall connecting means at a first of the two pivot locations which are downwardly spaced from the peripheral edge section. The cover actuating means includes an upper end section and a lower end section with the upper end section being pivotally mounted to the connecting member at an upper pivot axis, and the lower end section being pivotally mounted to the sidewall means at a lower pivot axis disposed at a second of the two pivot locations. The lower pivot axis being spaced downwardly and outwardly from the first of the two pivot axis locations and the sidewall means with the cover actuating means being effective to move between an extended position and a retracted position wherein the cover portion is in the closed top position when the cover actuating means is in an extended position, and the cover portion is in an open top position when the cover actuating means is in a retracted position.

The mobile base means of this assembly includes a structural configuration comprising a wagon, flat-bed vehicle, trailer, dump truck, semitrailer, or railroad car. In a specific embodiment, the bottom portion includes means for discharging bulk material contents from the receptacle at the unloading position. The sidewall means includes a pivot location housing means that projects inwardly along an inside surface of the receptacle, and the cover pivot axis location is laterally spaced inwardly with respect to an outside surface of the sidewall means within the pivot location housing means. The cover portion has an inner surface against which the bulk material is disposed when piled to a level above the top peripheral edge section of the container, and the cover actuating means produces a leveraged force to the cover portion in an amount sufficient to compress the piled bulk material disposed in the receptacle when the cover actuating means moves the cover portion from an open position to a closed position.

In a specific embodiment, the sidewall means includes a planar sidewall portion, and the sidewall connecting means includes at least two connecting members laterally spaced along the planar sidewall portion. The cover actuating means includes a cover actuation mechanism that is connected at one end thereof to each connecting member, and is connected at the other end thereof to the lower pivot axis which is spaced outwardly from the planar sidewall portion. When the sidewall means includes a plurality of planar sidewall portions, the sidewall connecting means is located along only one of the planar sidewall portions.

A feature of this embodiment is that the cover portion includes an inner cover surface that becomes separated a spaced distance from the top edge section to form a gap extending the length of the planar sidewall portion when the cover portion is in an open top position to receive bulk material into the receptacle. Barrier means is spaced inwardly from the planar sidewall portion for deflecting bulk material into the receptacle that forcefully impinges against the inner cover surface from a location outside the container. The barrier means extends downwardly from the inner cover surface by an amount sufficient to preclude the discharge of bulk material through the spaced distance of the gap along the length of the planar sidewall portion when the bulk material is directed into the receptacle. In one embodiment, the barrier means is fixedly attached to and extending downwardly from the inner cover surface. In another embodiment, the barrier means is pivotally and slidably attached along an upper side edge thereof to the inner cover surface at a location which is inwardly spaced from the top edge section of the planar sidewall portion. The barrier means extends downwardly from the inner cover surface and is pivotally attached along a lower side edge thereof to the top edge section of the planar sidewall portion. Here hinge means pivotally couples the lower side edge of the barrier means to the top edge section of the sidewall portion.

Another feature of the assembly of the invention is directed to a cover portion that includes a downwardly extending section having a distal end portion pivotally connected at a cover pivot location downwardly spaced from the top peripheral edge section. The cover actuating means has first and second end sections with the first end section being pivotally mounted to the downwardly extending section of the cover portion at an upper actuating pivot axis, and the second end section is pivotally mounted at a lower actuating pivot axis that is spaced downwardly from the top peripheral edge section. The distal end portion of the downwardly extending section includes at least one elongated connecting member, and the lower actuating pivot axis of the second end section is spaced downwardly from the cover pivot location for the elongated connecting member.

More specifically, bracket means is rigidly connected to a cover section of the cover portion, and at least one elongated connecting member is rigidly connected at one end thereof to the bracket means, and the elongated connecting member is pivotally connected at the other end thereof to a cover pivot axis disposed at the cover pivot location for the downwardly extending section. The upper actuating pivot axis of the cover actuating means is disposed at an intermediate location between the cover section and the cover pivot location, and the lower actuating pivot axis is spaced downwardly from the cover pivot location for the downwardly extending elongated connecting member.

Further features of the assembly of the invention are directed to the use of a cover pivot location of the downwardly extending section being disposed in a first vertically disposed plane, and the lower actuating pivot axis of the cover actuating means is located in a second vertically disposed plane that is parallel to the first vertically disposed plane, and laterally spaced outwardly from the sidewall means and the first vertically disposed plane. The cover pivot location is also located in a first horizontally disposed plane, and the lower actuating pivot axis is in a second horizontally disposed plane that is parallel to the first horizontally disposed plane of the cover pivot location. The cover actuating means may include hydraulically driven piston means effective to move between an extended position and a retracted position wherein the cover portion is in the closed top position when the cover actuating means is in an extended position, and the cover portion is in an open top position when the cover actuating means is in a retracted position.

When necessary, sealing means is disposed between the cover portion and the upwardly facing top peripheral edge section when the cover portion is in the closed top position. The sidewall means comprises a plurality of planar sidewall portions including container end planar sidewall portions, and the cover portion includes at least one end wall means for preventing bulk material from being discharged over a container end planar sidewall portion of the sidewall means while the receptacle is being loaded with the bulk material from a loading location outside the receptacle and disposed a spaced distance away from the sidewall means.

BRIEF DESCRIPTION OF DRAWINGS

Other objects of this invention will appear in the following description and appended claims, reference being made to the accompanying drawings forming a part of the specification wherein like reference characters designate corresponding parts in the several views.

DETAILED DESCRIPTION OF SPECIFIC EMBODIMENTS

Figure 1:
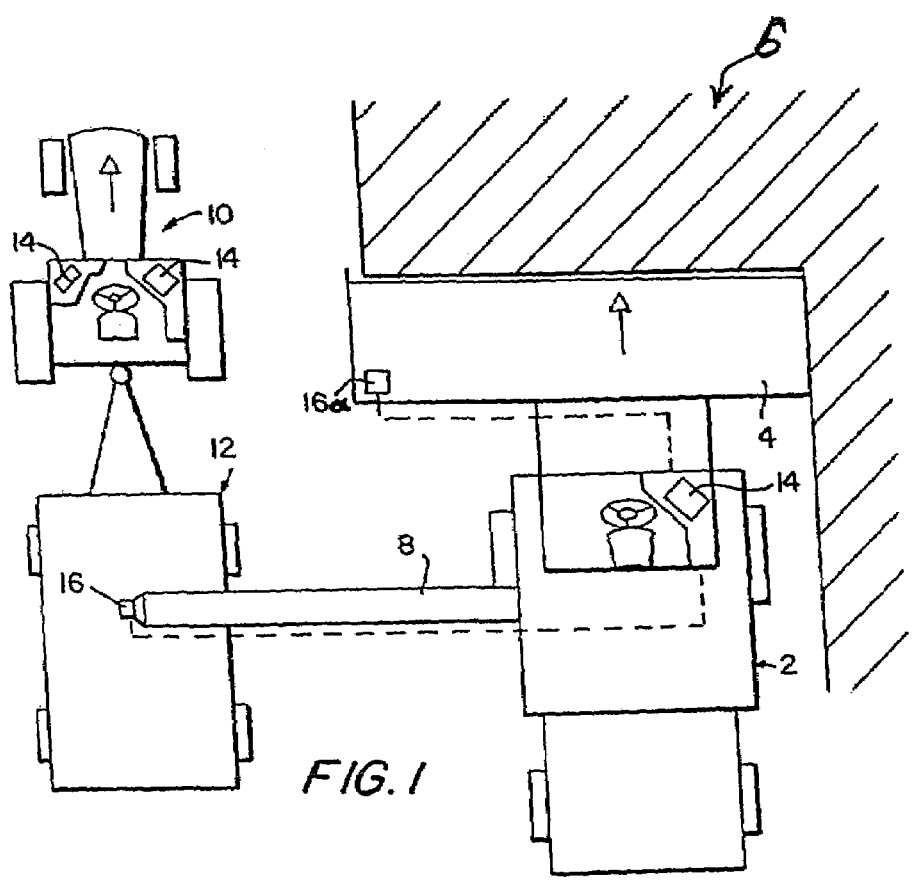
FIG. 1 is a diagrammatic top plan view of a prior art harvester assembly for harvesting and directing the harvested crop into a top-loading container assembly.
Figure 2:
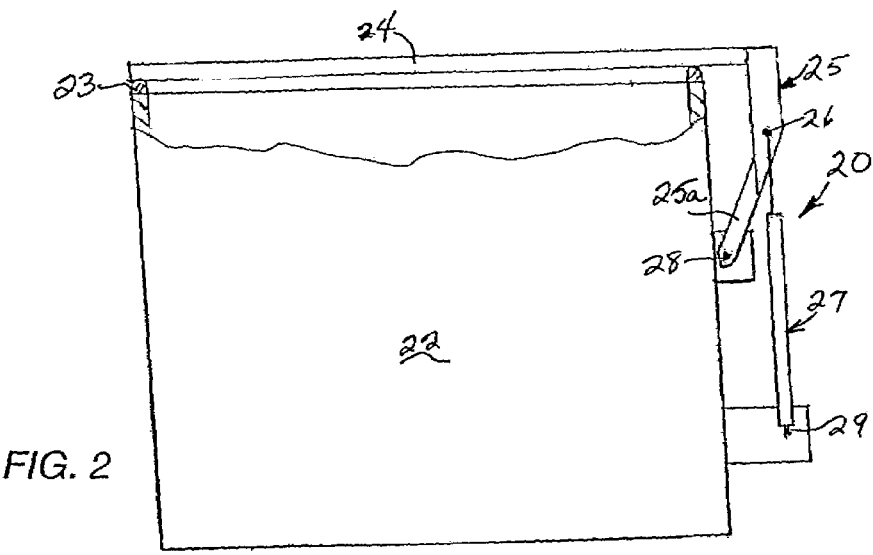
FIG. 2 is a diagrammatic, fragmentary sectional view of a top-loading container assembly of the invention having an actuating mechanism mounted to a sidewall of a container with the top cover in a fully closed position.

A first embodiment of the invented top-loading container assembly, generally designated 20, and shown in FIG. 2 comprises container 22 having an upper peripheral edge section with a compressible sealing member 23 attached to a top peripheral flat surface that precludes material from flowing into or out of the container receptacle when cover member 24 is in a fully closed position. Container 22 may have any desired horizontal cross-sectional geometric shape. For example, the container may be cylindrical having a circular cross-section, square or otherwise rectangular having a plurality of planar sidewalls. The invented actuating mechanism for opening and closing the top cover 24 may be mounted on a planar sidewall of container 22 that has a curved sidewall extending outwardly from the two ends of the planar sidewall portion of the container. Depending on the particular container shape, the assembly may include one or more actuating mechanisms to rotate cover member 24 about the cover pivot axis.

Cover member 24 includes an extension portion, generally designated 25, having an elongated connecting member 25a that is fixedly connected at one end thereof to extension portion 25 of cover member 24, and is pivotally mounted at the other end thereof to flange 28 that is fixedly mounted to and projects outwardly from the container sidewall as shown. With the connection of extension portion 25 and connecting member 25a, cover member 24 rotates as a unit with the extension portion about an cover pivot axis on flange 28 that is spaced downwardly from the upper peripheral edge section of container 22, and outwardly from the outer container sidewall surface as shown. When the cover pivot axis is at a location that projects inside the inner surface of container, an internal pivot axis chamber is required as shown in the embodiments of FIGS. 8–15 so that the pivot axis remains outside the container receptacle.

Hydraulic piston/cylinder unit 27 acts as an actuating member in this embodiment, but any actuating mechanism that extends and retracts with respect to the two pivot axes to which it is coupled may be used. Hydraulic unit 27 is pivotally mounted at one end thereof to extension portion 25, and pivotally mounted to flange 29 so that when the unit is in an extended position as shown in FIG. 2, cover member 24 is fully closed as shown. As the cover member assembly rotates, a gap forms between the inside surface of cover member 24 and the upper edge surface of the upper peripheral edge section of container 22. A double pivot connection includes two pivot axis locations downwardly space from the top edge section, and are further laterally spaced horizontally and vertically with respect to each other as shown. The unique actuating arrangement of the invention moves cover member 24 independent of the top peripheral edge section of container 22 and produces a force in both the opening and closing of cover member 24. The downward force in the closed position of cover member 24 compresses sealing member 23 to obtain the desire sealing condition when bulk materials are to be protected from the outside environment, and to prevent loss of material from inside container 22.

Figures 3, 4:
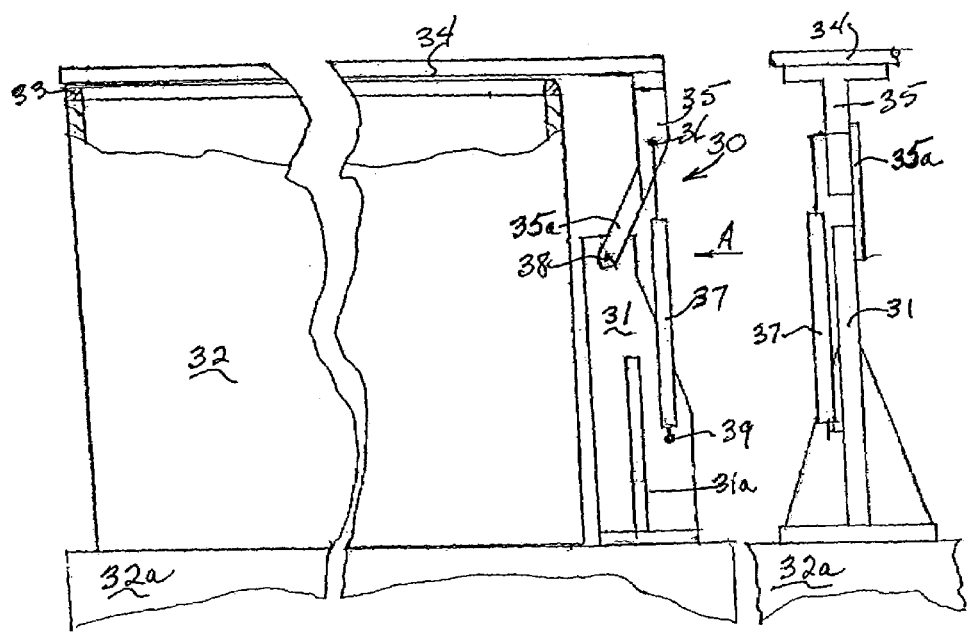
FIG. 3 is a diagrammatic view, partially in section, of another embodiment of a top-loading container assembly of the invention having an actuating mechanism mounted to a supporting base with the top cover in a fully closed position.
FIG. 4 is a diagrammatic elevation view along direction line A of FIG. 3 showing only the actuating mechanism of the invention.

Assembly 30 in FIGS. 3–4 operates in the same manner as the embodiment of FIG. 2 except for the use of coupling stand 31 attached to the base member 32a so that container 32 is removably supported on base member 32a. The actuating mechanism connects to coupling stand 31 to provide the same double pivot connection of the previous embodiment, and operates in the same manner as discussed above. Coupling stand 31 includes a buttress reinforcement structure 31a and is fixedly attached to the flat base 32a. The extension portion 35 and connecting member 35a rotate cover member 34 about cover pivot axis 38, and actuating member 37 is coupled to pivot about an upper pivot axis 36 and lower pivot axis 39 to open and close cover member 34 and compress sealing member 33 as shown. Lower pivot axis 39 is at a pivot location lower than cover pivot axis 38 and is in a first vertical plane that is parallel to a second vertical plane through cover pivot axis 38. As shown, the first vertical plane is outwardly spaced from the second vertical plane. Upper pivot axis 36 is also downwardly spaced and independent of the top peripheral edge section of container 32.

Figure 5:
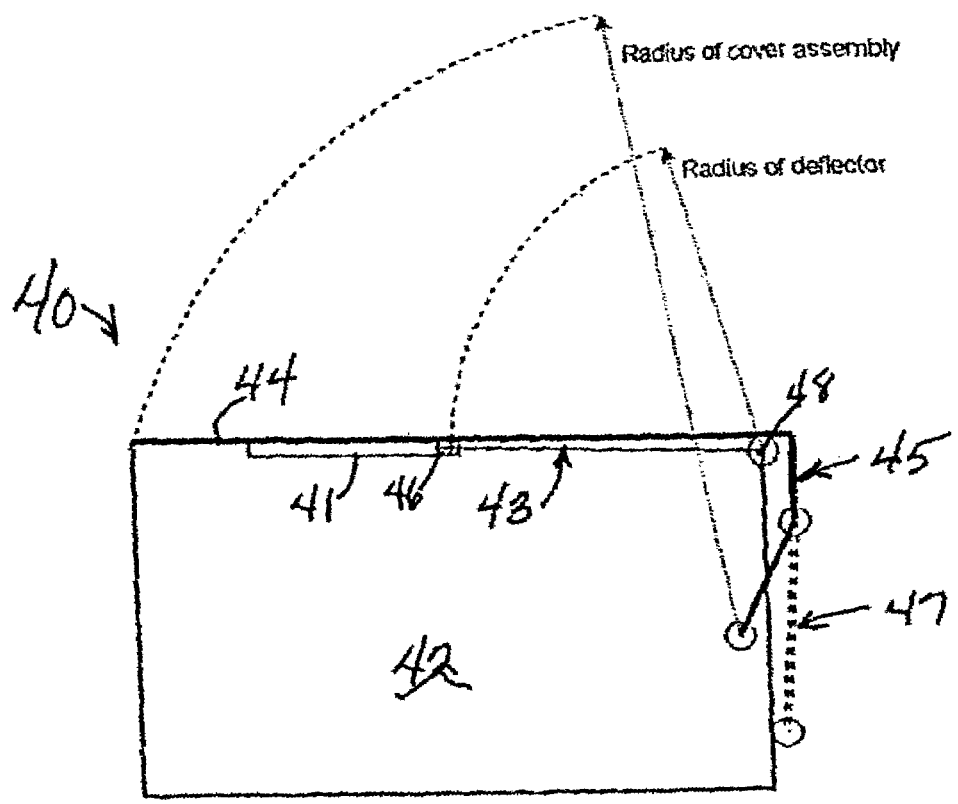
FIG. 5 is a diagrammatic elevation view of a third embodiment of a top-loading container assembly of the invention with the top cover in a fully closed position and having a pivotally mounted barrier structure.
Figure 6:
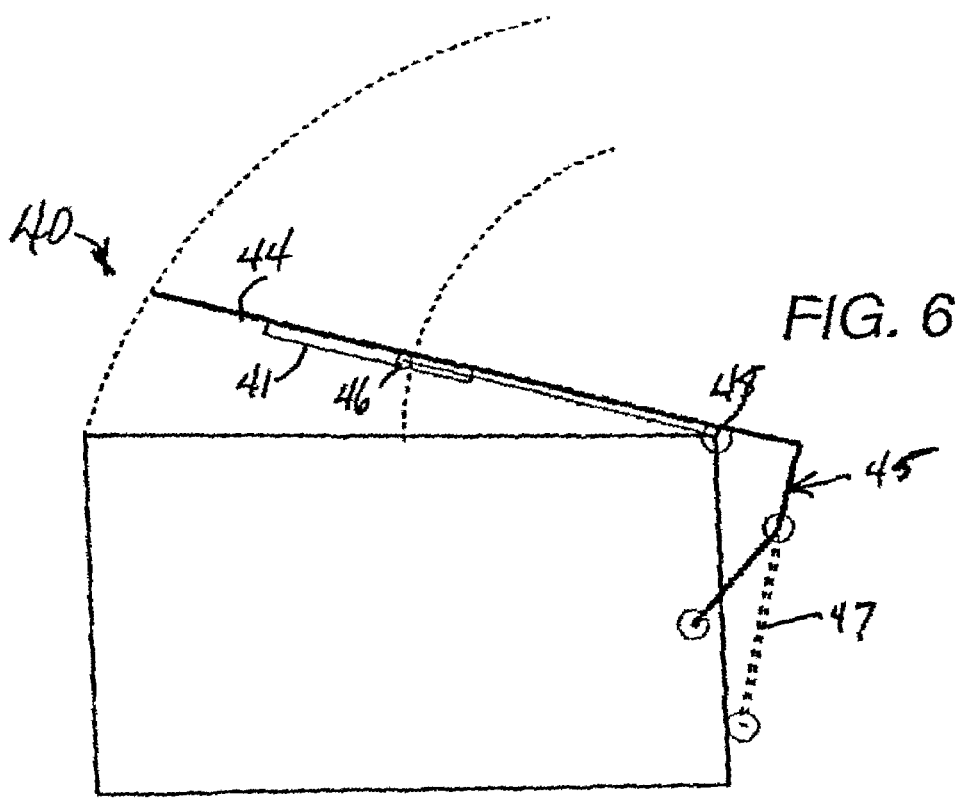
FIG. 6 is a diagrammatic elevation view of the top-loading container assembly of the invention shown in FIG. 5 with the top cover in an open position.
Figure 7:
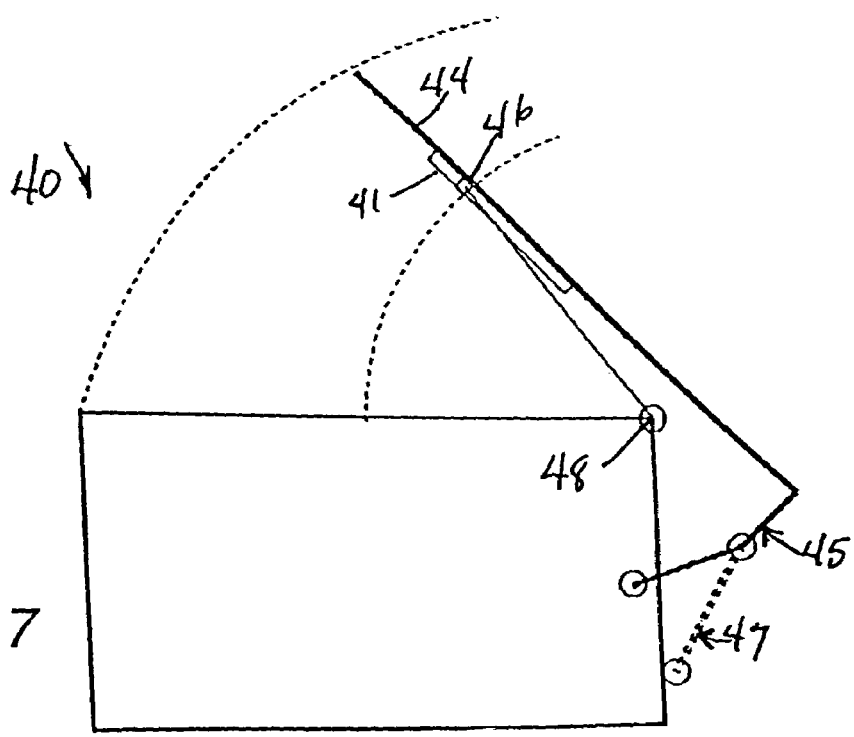
FIG. 7 is a diagrammatic elevation view of the top-loading container assembly of the invention shown in FIG. 5 with the top cover in a fully open position.

Assembly 40 in the embodiment of FIGS. 5–6 includes movable barrier member 43 designed to prevent loss of bulk material directed against the inner surface of cover member 44 when it is in an open position. Barrier member 43 is pivotally mounted to a fixed pivot location at the top of the upper peripheral edge section of container 42. Shown is the respective relationship between the radius of movement for cover member 44 about the "inside the container" pivot axis compared to the radius of movement for barrier deflector 48 pivotally mounted to the top peripheral edge section of sidewall for container 42. Barrier member 43 is fixed to barrier carrier 46 so that as cover 44 rotates from a closed position to an open position, carrier 46 moves toward the outer distal edge of cover 44 within the carrier bracket 41 that is fixed to the inner surface of cover member 44. So any bulk material directed into container 42 is deflected into the container receptacle without any material loss through the "cover gap" and out of the container.

Figure 8:
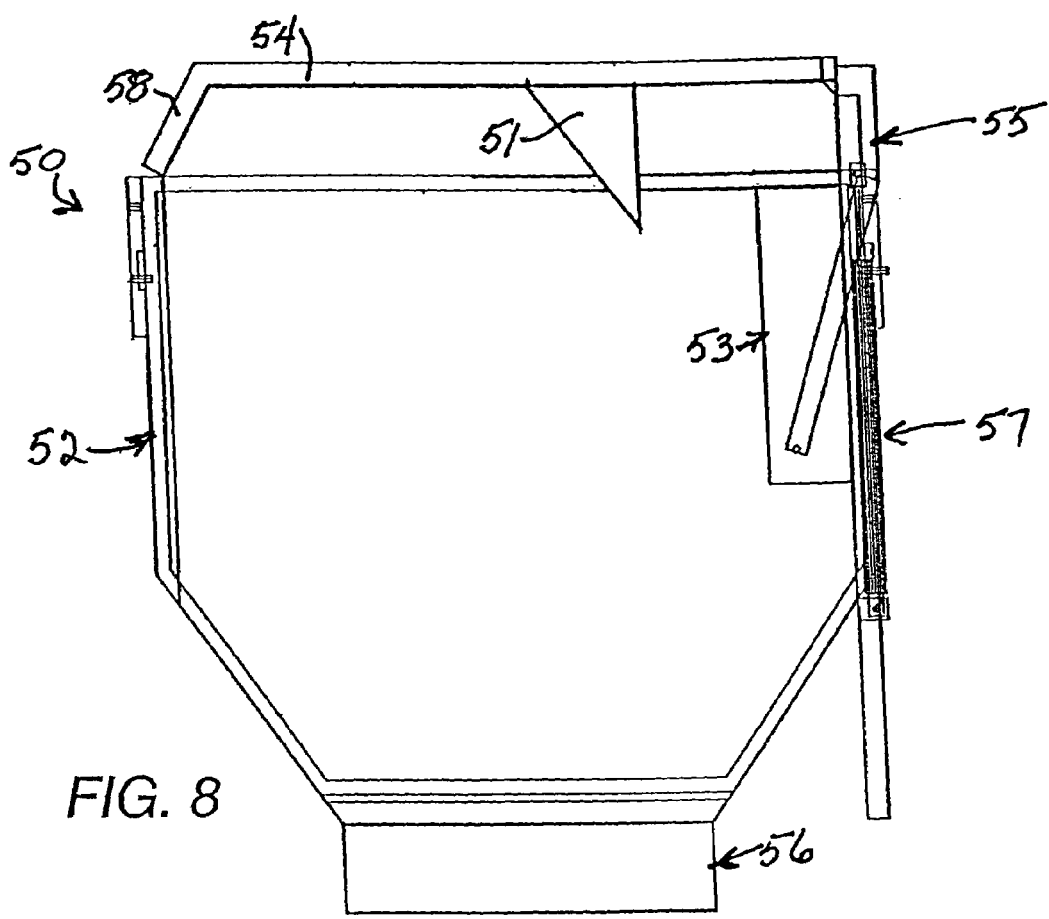
FIG. 8 is a diagrammatic elevation rear view, partly in section, of a fourth embodiment of a top-loading assembly of the invention with the cover member in a closed position, and showing a stationary barrier member to deflect bulk material into the container receptacle as it is directed against the inner surface of the cover member.
Figure 9:
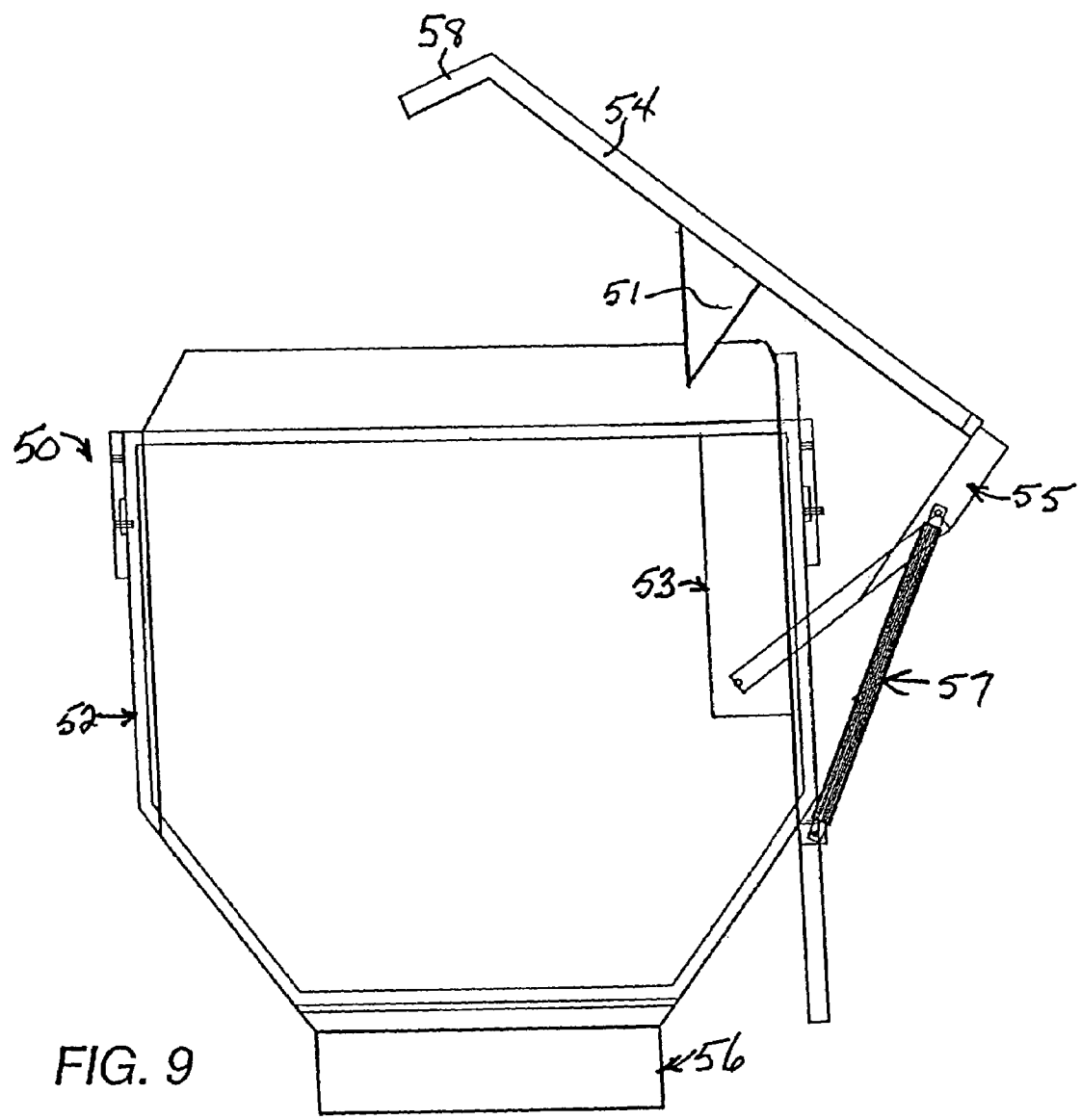
FIG. 9 is a diagrammatic elevation rear view, partly in section, of the top-loading assembly of the invention of FIG. 8 showing the cover member in an open position, and a stationary barrier member disposed to deflect bulk material into a receptacle of the container as material is directed against the inner surface of the cover member.

The embodiment of FIGS. 8–9 shows a more specific application of top-loading container assembly 50 of the invention for use in harvesting crops and transporting them from the field to a crop unloading location. The top-loading container 52 has a known structural configuration that is mounted in a known manner to a mobile wagon or trailer chassis and in this embodiment the upper portion of the sidewalls extend upwardly by at least 5 feet. Discharge conveyor system 56 dispenses bulk materials received and collected through the open top of the container when bulk material such as forage, grain, and the like are forcefully directed against the inner surface of cover member 54 when it is in an opened position. Stationary barrier 51 has a right triangular cross-section, is fixedly attached to the inner surface of cover member 54, and extends the entire length of the elongated container. Barrier member 51 projects downwardly by an amount sufficient to cover over the gap between the inner surface of the cover and the upper peripheral edge section as shown in FIG. 9.

The unique cover member 54 includes an outer apron portion 58 that extends the entire length of the cover structure comprising a series of outer support struts welded to planar sheets of metal material that provides a total weight that the actuating mechanism is effective to open and close. The novel top cover structure enable to the harvester directs harvested bulk material into the container where air is eliminated as it impacts the surface area of cover member 54 and barrier 51 to a level above the top level of the peripheral edge section. The amount may be piled to a level that extends upwardly against the inner surface of opened cover member 54. The pile level could extend up to as high as about five (5) feet or more above the upper peripheral edge section. When so piled, the downward rotation of cover member 54 upon extending actuating member 57 urges the piled bulk material toward the distal edge apron portion that prevents material loss from container 52. At the same time, cover member 54 compresses the excess bulk material to eliminate air thus increasing the load density.

Figure 10:
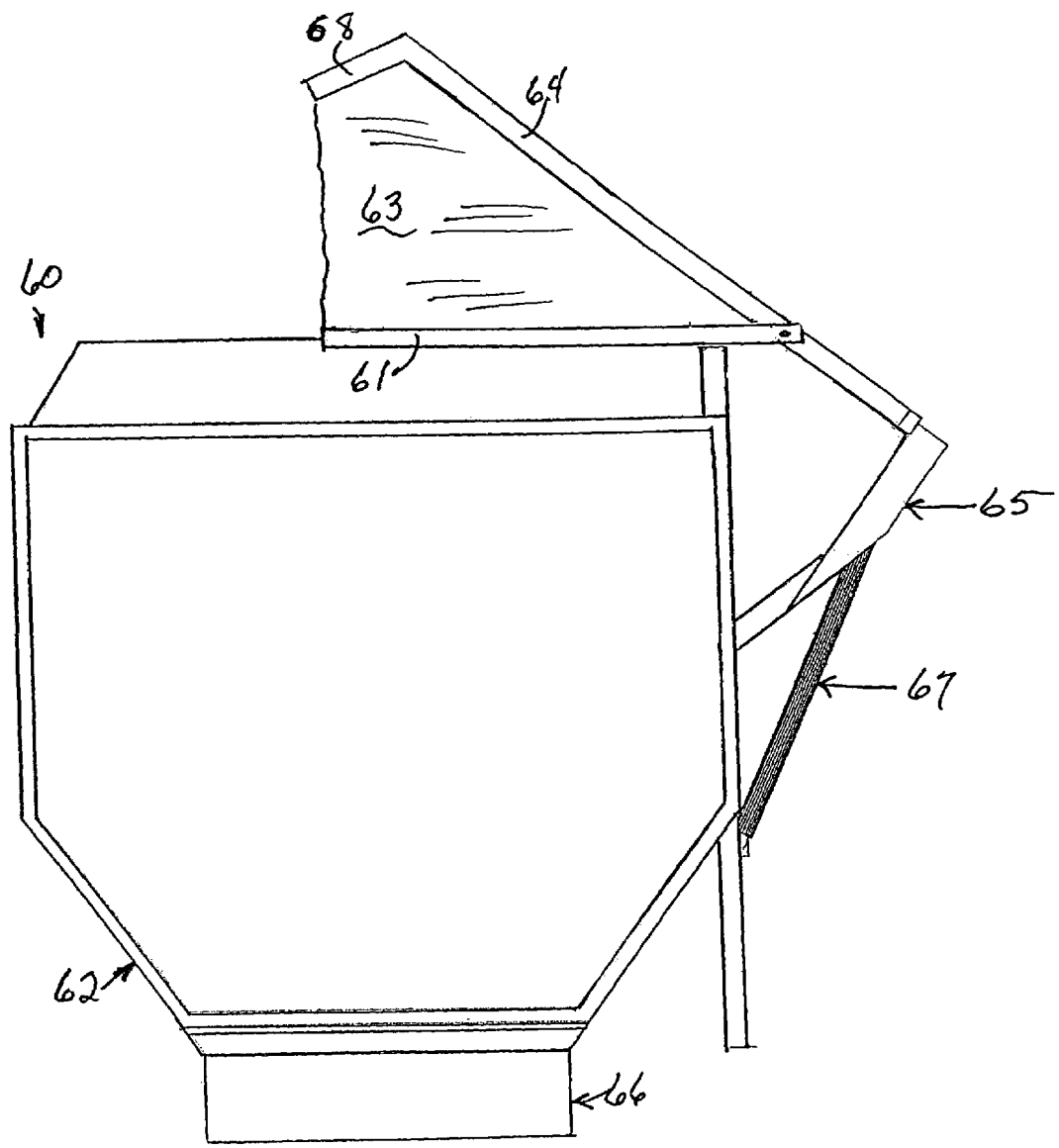
FIG. 10 is a diagrammatic elevation rear view of a fifth embodiment of the top-loading assembly of the invention showing the cover member in an open position, and a flexible end wall having an elongated base member pivotally mounted to the top cover member disposed to prevent bulk material loss over the rear end of the container as material is directed against the inner surface of the cover member.
Figures 11, 11A:
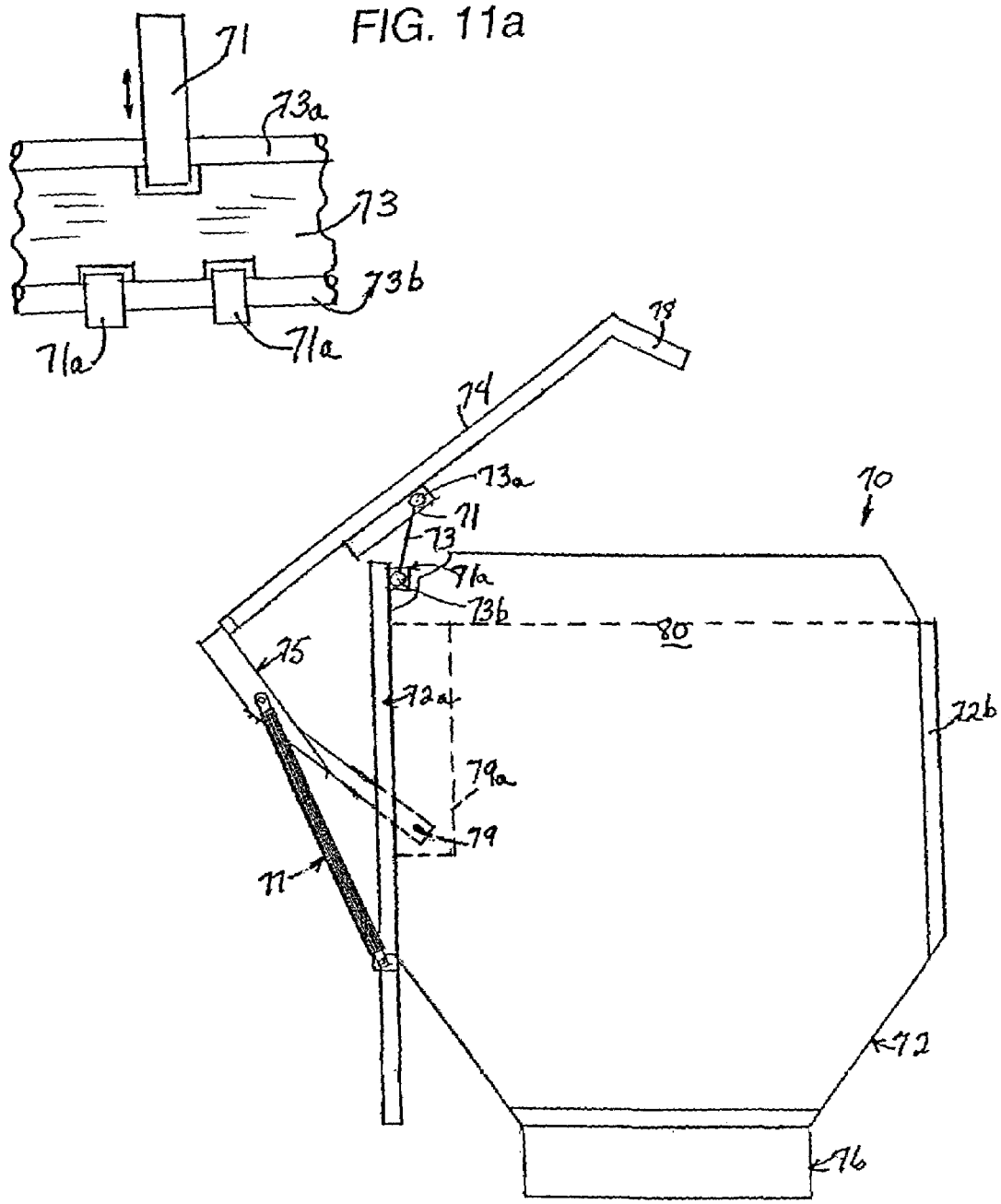
FIG. 11 is a diagrammatic elevation rear view, partly in section, of a sixth embodiment of a top-loading assembly of the invention with the cover member in an open position, and showing a pivotally mounted barrier member disposed to deflect bulk material into the container receptacle as material is directed against the inner surface of the cover member.
FIG. 11a is a diagrammatic fragmentary elevation view of the barrier member assembly of the invention as shown in FIG. 11 when the top cover in an open position that is almost closed.
Figure 12:
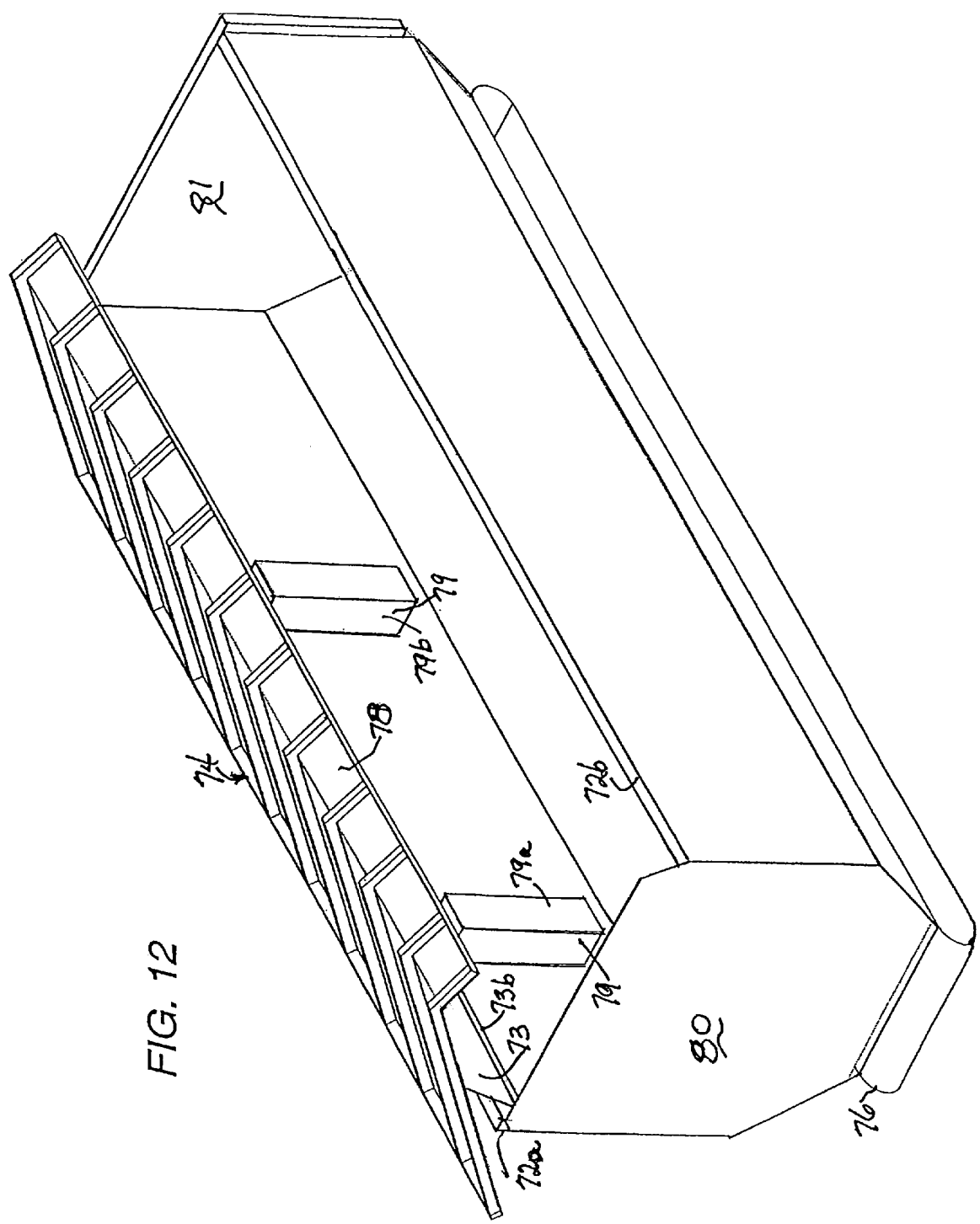
FIG. 12 is a diagrammatic front perspective view of the top-loading container assembly of the invention shown in FIG. 11 with the top cover in an open position.
Figure 13:
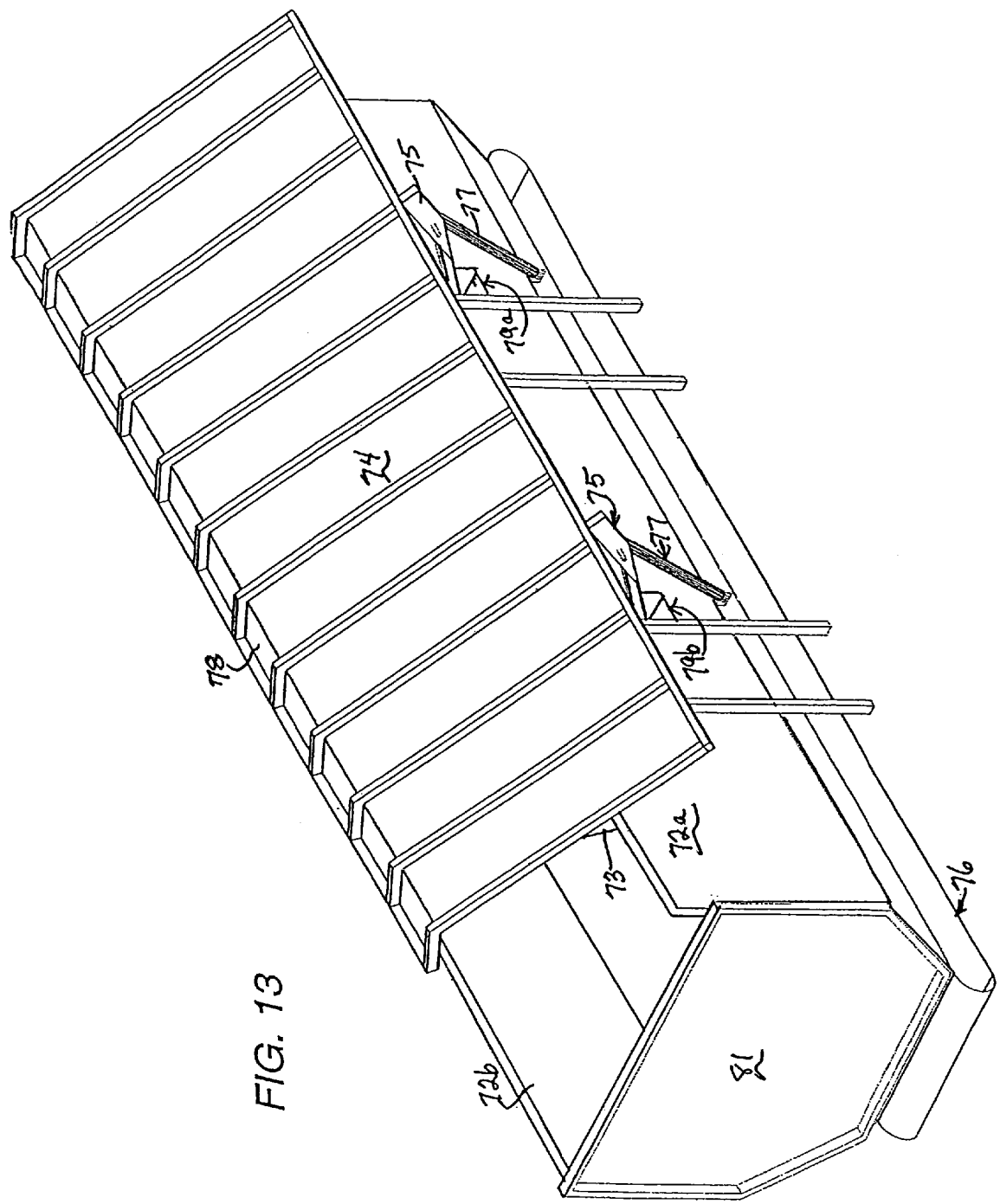
FIG. 13 is a diagrammatic rear perspective view of the top-loading container assembly of the invention shown in FIG. 11.
Figure 14:
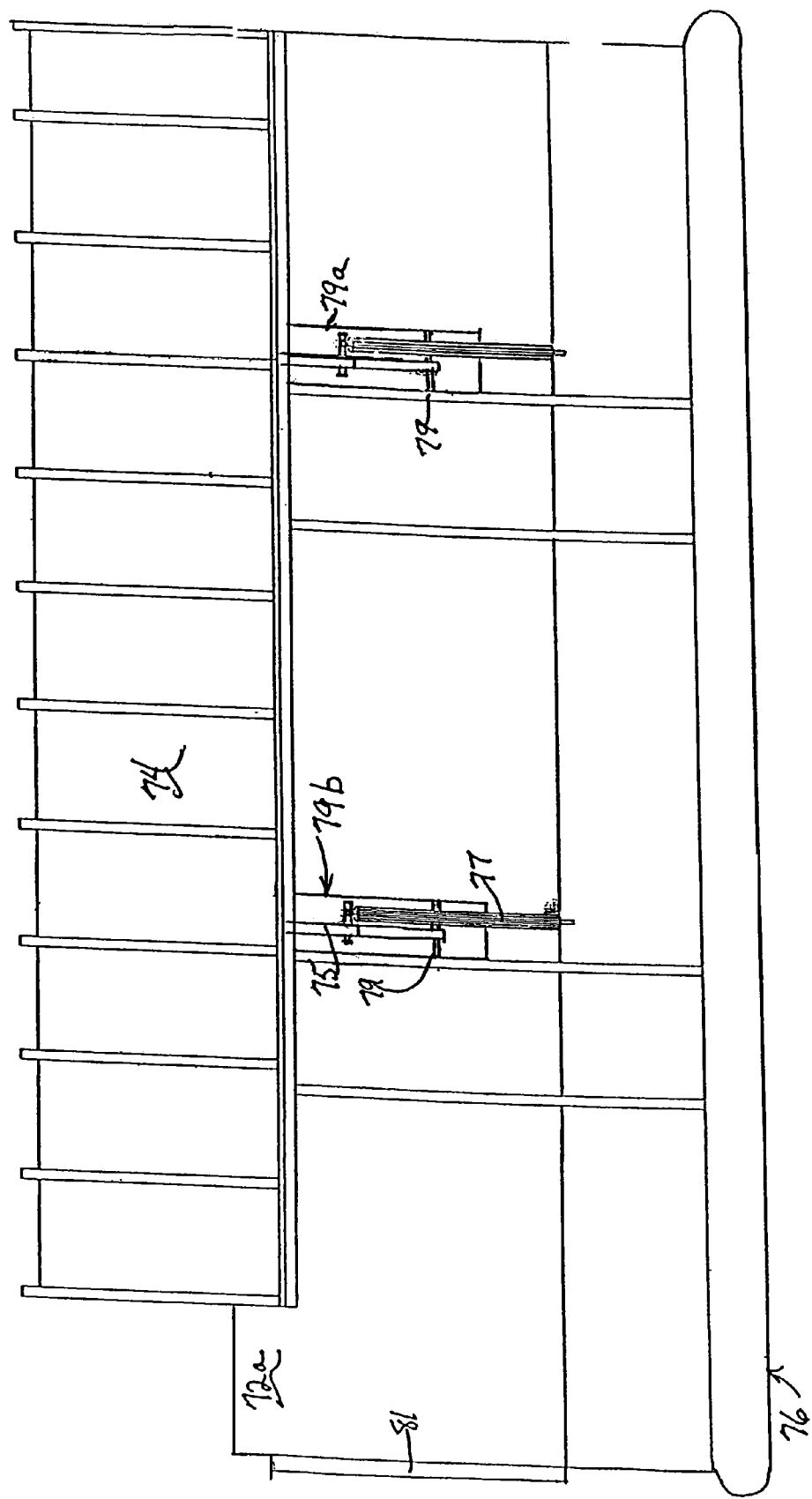
FIG. 14 is a diagrammatic side elevation view of the top-loading container assembly of the invention as shown in FIG. 13.
Figure 15:
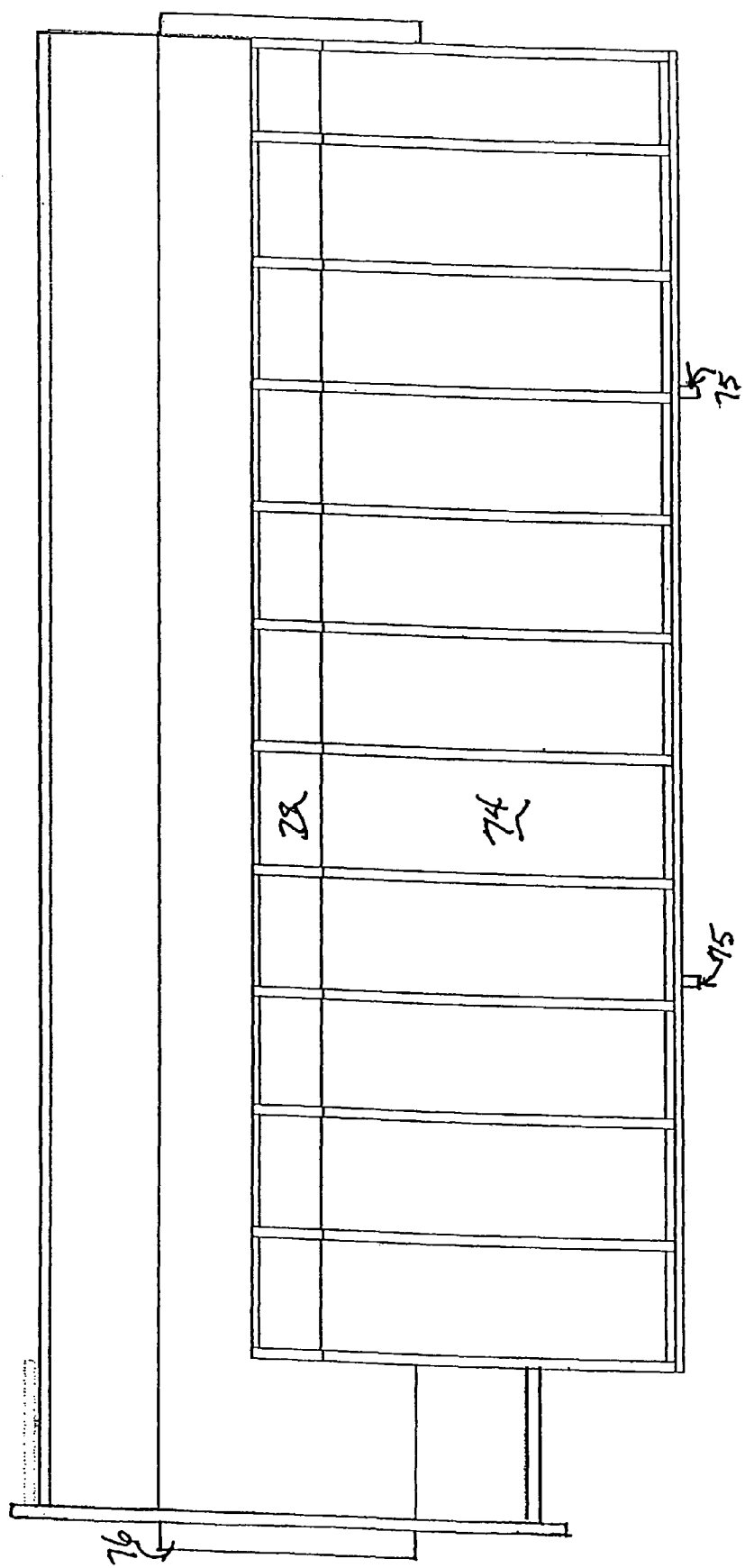
FIG. 15 is a diagrammatic top plan view of the top-loading container assembly of the invention a shown in FIG. 14.

In the embodiment of FIG. 10, the assembly 60 comprises container 62, bottom discharge conveyor system 66, and the top cover assembly that includes cover member 64, extension portion 65, actuating member 67, and apron portion 68. An elongated bar member 61 is connected to a foldable end wall 63 of flexible sheet material, and is pivotally coupled at an inner end to cover member 64. When unfolded as shown, the structure provides an end wall that prevents loss of material over the rear end of container 62 whenever the harvester forcefully directs material against it during the harvesting process. In this embodiment, the overall width of the top cover member 64 and apron portion 68 is about 90 inches, and bar member 61 is about 60 inches long to form end wall 63.

The embodiment of FIGS. 11–15 shows the overall structure of an agricultural wagon or trailer used to receive, collect, and transport a harvested crop. Assembly 70 comprises container 72 including side wall 72a that is higher than opposed sidewall 72b, front end wall 80, rear discharge gate 81, and discharge conveyor system 76. A movable barrier deflector 73 is fixedly connected to carrier members 73a and 73b to protect loss through the top cover gap as discussed above in the embodiment of FIGS. 8–9. In this embodiment, barrier deflector 73 is a planar sheet metal member that is welded at each opposed edge to rod-shaped metal carrier member 73a that slides and rotates in barrier bracket 71, and carrier member 73b that rotates within carrier brackets 71a. Deflector 73 is appropriately notched as shown in FIG. 11a to accommodate movement of deflector 73 and carrier member 73a in two directions along bracket 71 as shown, and rotation of carrier member 73b within carrier brackets 71a as cover member 74 is opened and closed. Top cover member 74, extension portion 75, actuating members 77, and distal apron portion 78 operate as in the earlier described embodiments. The length of cover member 74 is shorter than the overall length of container 72 to allow room for gate member 81 to pivotally open above the upper peripheral edge sections of the sidewalls 72a and 72b. The lower pivot axes 79 are outside the receptacle so internal housings 79a and 79b project into the receptacle to form chambers within which pivot axes 79 of extension portions 75 can effect their operational movement to open and close cover member 74. In this embodiment, lower pivot axis of hydraulic cylinder 77 is outwardly horizontally spaced from pivot axis 79 by about seven (7) inches, and downwardly vertically spaced from pivot axis 79 by about twelve (12) inches, and the cylinder of hydraulic unit is about four (4) inches in diameter and about 48 inches long.

A feature of the specific embodiment of the assembly when produced for an agricultural harvesting application is directed to some other specific structural dimensions. When viewing the assembly from a location above the open-top container, the width between the inner surfaces of the sidewalls is more narrow at the front of the container than at the rear. The changing width from front to back is continuous so that the rear most width is about six (6) inches wider than the front most width of the container. So upon activating the bottom conveyor mechanism for discharging a compressed forage load at a location remote from the field, any lateral force between the load and inner surfaces of the sidewalls is overcome as the load moves about two (2) inches rearwardly, or for a distance sufficient to produce a clearance of about three (3) to five (5) inches from each sidewall.

Depending on the number of axles on a trailer or wagon, the overall length of the container can vary by several feet. For example, with two (2) axles the length may be about twenty-eight feet long, but with three (3) axles the length may be more than thirty feet long. The container length is generally regulated by an authorized governmental department of transportation. In this embodiment, the overall outside width of the container is about nine (9) feet.

While the top-loading container and assembly have been shown and described in detail, it is obvious that this invention is not to be considered as limited to the exact form disclosed, and that changes in detail and construction may be made therein within the scope of the invention without departing from the spirit thereof.

Having thus set forth and disclosed the nature of this invention, what is claimed is:

1. A top-loading container for collecting, storing, and transporting bulk material, said container comprising:
    a) sidewall means, a bottom portion, and a cover portion; said sidewall means defining a load-carrying receptacle and including an upwardly facing top peripheral edge section having an open top; and
    b) sidewall connecting means for pivotally mounting said cover portion to said sidewall means at two pivot locations which are disposed outside of the receptacle and downwardly spaced from said peripheral edge section; said sidewall connecting means being effective to freely move said cover portion independent of said top peripheral edge section between a closed top position and an open top position;
    c) said sidewall connecting means including cover actuating means, cover extension means having two ends, and at least one connecting member having two ends;
    d) said cover extension means being fixedly mounted at one end thereof to said cover portion, and being fixedly mounted at the other end thereof to one end of said connecting member that is pivotally connected at the other end thereof to said sidewall means at a first of said two pivot locations;
    e) said cover actuating means including an upper end section and a lower end section; said upper end section being pivotally mounted to said cover extension means at an upper pivot axis, and said lower end section being pivotally mounted to said sidewall means at a lower pivot axis disposed at a second of said two pivot locations; said lower pivot axis being spaced downwardly and outwardly from said first of said two pivot locations and outwardly from said sidewall means;
    f) said cover actuating means being effective to move between an extended position and a retracted position wherein said cover portion moves independently of said top peripheral edge section and is in said closed top position when said cover actuating means is in said extended position, and the cover portion is in said open top position when said cover actuating means is in said retracted position.

2. A top-loading container for collecting storing, and transporting bulk material, said container comprising:
    a) sidewall means, a bottom portion, and a cover portion, said sidewall means defining a load-carrying receptacle and including an upwardly facing top peripheral edge section having an open top; and
    b) sidewall connecting means for pivotally mounting said cover portion to said sidewall means at two pivot locations which are disposed outside of the receptacle and downwardly spaced from said peripheral edge section; said sidewall connecting means being effective to freely move said cover portion independent of said top peripheral edge section between a closed top position and an open top position;
    c) said sidewall connecting means including cover actuating means, cover extension means having two ends, and at least one connecting member having two ends;
    d) said cover extension means being fixedly mounted at one end thereof to said cover portion, and being fixedly mounted at the other end thereof to one end of said connecting member that is pivotally connected at the other end thereof to said sidewall means at a first of said two pivot locations;
    e) said cover actuating means including an upper end section and a lower end section; said upper end section being pivotally mounted to said cover extension means at an upper pivot axis, and said lower end section being pivotally mounted to said sidewall means at a lower pivot axis disposed at a second of said two pivot locations; said lower pivot axis being spaced downwardly and outwardly from said first of said two pivot locations and outwardly from said sidewall means;
    f) said cover actuating means being effective to move between an extended position and a retracted position wherein said cover portion is in said closed top position when said cover actuating means is in said extended position, and the cover portion is in said open top position when said cover actuating means is in said retracted position;
    g) said sidewall means includes a pivot location housing means that projects inwardly along an inside surface of the receptacle; and
    h) said first of said two pivot locations is laterally spaced inwardly with respect to an outside surface of the sidewall means within said pivot location housing means.

3. The top-loading container as defined in claim 1 wherein said cover portion has an inner surface against which inner cover surface said bulk material is disposed when piled to a level above the top peripheral edge section of said container,
    said cover actuating means is effective to produce a leveraged force to the cover portion so as to be effective to compress said piled bulk material disposed in said receptacle when said cover actuating means moves the cover portion from an said open position to said closed position.

4. The top-loading container as defined in claim 3 wherein said cover portion has an outer apron section extending along an outer free distal edge of a top cover section which is mounted to said sidewall connecting means along a cover connecting edge section that is opposite said outer apron section, said outer apron section being inclined downwardly with respect to said top cover section at an angle sufficient to maintain the bulk material within the receptacle when the cover portion moves to said closed top position thereby causing the bulk material to move toward said outer free distal edge of the top cover section.

5. The top-loading container as defined in claim 1 wherein said sidewall means includes a planar sidewall portion, said sidewall connecting means includes at least two connecting members laterally spaced along said planar sidewall portion, and
said cover actuating means includes a cover actuation mechanisms each having two ends with one end thereof connected to a respective one of said connecting members, and the other end thereof connected to a respective pivot axis which is spaced outwardly from said planar sidewall portion.

6. A top-loading container for collecting, storing, and transporting bulk material, said container comprising:
a) sidewall means defining a load-carrying receptacle and including an upwardly facing top peripheral edge section having an open top,
b) a cover portion including a downwardly extending section having a distal end portion pivotally connected at a cover pivot axis location downwardly spaced from said top peripheral edge section and mounted to freely move independently of said top peripheral edge section to uncover and cover the open top of the load-carrying receptacle, and
c) actuating means for lifting the cover portion upwardly and freely out of contact with and away from the top peripheral edge section, said actuating means having first and second end sections with said first end section pivotally mounted to said downwardly extending section of the cover portion at an upper actuating pivot axis location, and said second end section pivotally mounted at a lower actuating pivot axis location that is spaced outwardly and downwardly from said cover pivot axis location,
d) said cover portion and said actuating means each being pivotally mounted to said sidewall means outside of the receptacle and at said pivot axis locations that are downwardly spaced from the top peripheral edge section for freely moving the cover portion between an open top position out of contact with the top peripheral edge section and a closed top position when in contact with the top peripheral edge section.

7. The top-loading container as defined in claim 5 wherein said cover portion includes an inner cover surface that becomes separated a spaced distance from the top edge section to form a gap extending the length of said planar sidewall portion when the cover portion is in said open top position to receive bulk material into said receptacle,
barrier means spaced inwardly from said planar sidewall portion for deflecting bulk material into the receptacle that forcefully impinges against the inner cover surface from a location outside the container,
said barrier means extending downwardly from said inner cover surface by an amount sufficient to preclude the discharge of bulk material through the spaced distance of the gap along said length of said planar sidewall portion when the bulk material is directed into said receptacle.

8. The top-loading container as defined in claim 7 wherein said barrier means is fixedly attached to and extending downwardly from said inner cover surface.

9. The top-loading container as defined in claim 7 wherein said barrier means is pivotally and slidably attached along an upper side edge thereof to the inner cover surface at a location which is inwardly spaced from said top peripheral edge section,
said barrier means extending downwardly from the inner cover surface and being pivotally attached along a lower side edge thereof to said top peripheral edgesection.

10. The top-loading container as defined in claim 9 wherein
said barrier means includes hinge means that pivotally couples said lower side edge of the barrier means to the top peripheral edge section.

11. A top-loading container for collecting, storing, and transporting bulk material, said container comprising:
a) sidewall means defining a load-carrying receptacle and including an upwardly facing top peripheral edge section having an open top,
b) a cover portion mounted to freely move independently of said top peripheral edge section to uncover and cover the open top of the load-carrying receptacle, and
c) actuating means for lifting the cover portion upwardly and freely out of contact with and away from the top peripheral edge section,
d) said cover portion and said actuating means each being pivotally mounted to said sidewall means outside of the receptacle and at pivot locations downwardly spaced from the top peripheral edge section for freely moving the cover portion between an open top position out of contact with the top peripheral edge section and a closed top position when in contact with the top peripheral edge section,
e) said cover portion includes a downwardly extending section having a distal end portion pivotally connected at a cover pivot location downwardly spaced from said top peripheral edge section,
f) said actuating means having first and second end sections with said first end section pivotally mounted to said downwardly extending section of the cover portion at an upper actuating pivot axis, and said second end section pivotally mounted at a lower actuating pivot axis that is spaced downwardly from said top peripheral edge section,
g) said distal end portion of said downwardly extending section includes bracket means rigidly connected to a cover section of said cover portion, and at least one downwardly extending elongated connecting member having two ends and being rigidly connected at one end thereof to said bracket means,
h) said elongated connecting member is pivotally connected at the other end thereof to a cover pivot axis disposed at said cover pivot location for said downwardly extending section,
i) said upper actuating pivot axis of the actuating means is disposed at an intermediate location between the cover section and said cover pivot location of said downwardly extending section, and j) said lower actuating pivot axis of the actuating means is spaced downwardly from said cover pivot location for said downwardly extending elongated connecting member.

12. The container as defined in claim 6 wherein
said actuating means is effective to move between an extended position and a retracted position wherein said cover portion is in said closed top position when said actuating means is in said extended position, and said cover portion is said open top position when said cover actuating means is in said retracted position.

13. The container as defined in claim 12 wherein
said actuating means includes hydraulically driven piston means to effect said movement between said extended and retracted positions.

14. The container as defined in claim 6 wherein
sealing means is disposed between said cover portion and said upwardly facing top peripheral edge section when said cover portion is in said closed top position.

15. The container as defined in claim 6 wherein
said cover pivot axis location of said downwardly extending section is disposed in a first vertically disposed plane, and
said lower actuating pivot axis location of the actuating means is disposed in a second vertically disposed plane that is parallel to the first vertically disposed plane, and laterally spaced outwardly from said sidewall means and said first vertically disposed plane.

16. A top-loading container assembly for collecting, storing, and transporting bulk materials, said container assembly comprising:
 a) a container including sidewall means for defining a load-carrying receptacle and including an upwardly facing top peripheral edge section having an open top,
 b) a cover portion mounted to freely move independently of said top peripheral edge section to uncover and cover the open top of the load-carrying receptacle,
 c) mobile base means for removably supporting said container so that the container is movable from a transport position to a dumping position for discharging contents of the receptacle, and
 d) means for lifting the cover portion upwardly and freely out of contact with and away from the top peripheral edge section of the container so as to be able to remove the container from the base means,
 e) said means for lifting the cover portion including a downwardly extending section having a lower end pivotally connected at a cover pivot location downwardly spaced from said top peripheral edge section of said container, and
 f) actuating means including first and second end sections with said first end section pivotally mounted to said downwardly extending section at an upper actuating pivot axis, and said second end section pivotally mounted at a lower actuating pivot axis for freely moving said lifting means for moving the cover portion between an open top position out of contact with the top peripheral edge section and a closed top position when in contact with the top peripheral edge section, said actuating means is effective to move between an extended position and a retracted position wherein said cover portion is in said closed top position when said actuating means is in said extended position, and said cover portion is said open top position when said cover actuating means is in said retracted position,
 g) said cover pivot location of said downwardly extending section is disposed in a first vertically disposed plane, and
 h) said lower actuating pivot axis of the actuating means is disposed in a second vertically disposed plane that is parallel to the first vertically disposed plane, and outwardly laterally spaced from said sidewall means and said first vertically disposed plane.

17. The container assembly as defined in claim 16 wherein
an upper end of said downwardly extending section includes means for holding said cover portion while moving the cover portion upwardly and freely out of contact with and away from the top peripheral edge section of the container.

18. The container assembly as defined in claim 16 wherein
said mobile base means includes a structural configuration for supporting said container on a wagon, flat bed vehicle, trailer, dump truck, semitrailer, or railroad car.

19. The container assembly as defined in claim 16 wherein
said cover portion includes said downwardly extending section having a distal end portion pivotally connected at said cover pivot location,
said first end section of said actuating means being pivotally mounted to said distal end portion at said upper actuating pivot axis, and said second end section of said actuating means being pivotally mounted at said lower actuating pivot axis.

20. The container assembly as defined in claim 19 wherein
said downwardly extending section includes bracket means rigidly connected to a cover section of said cover portion, and at least one downwardly extending elongated connecting member having two ends and being rigidly connected at one end thereof to said bracket means for forming said distal end portion,
said elongated connecting member is pivotally connected at the other end thereof to a cover pivot axis disposed at said cover pivot location for said downwardly extending section,
said upper actuating pivot axis of the actuating means is disposed at an intermediate location between the cover section and said cover pivot location of said downwardly extending section, and
said lower actuating pivot axis of the actuating means is spaced downwardly from said cover pivot location for said downwardly extending elongated connecting member.

21. The container assembly as defined in claim 16 wherein
said cover actuating means includes hydraulically operated piston means.

22. The container assembly as defined in claim 19 wherein
sealing means is disposed between said cover portion and said upwardly facing top peripheral edge section for preventing passage of material in or out of said receptacle between said cover portion and said top peripheral edge section when said cover portion is in said closed top position.

23. A mobile top-loading container assembly for collecting, storing, and transporting bulk material, said container assembly comprising:
 a) a container including sidewall means, a bottom portion, and a cover portion; said sidewall means defining a load-carrying receptacle and including an upwardly facing top peripheral edge section having an open top; and b) sidewall connecting means for pivotally mounting said cover portion to said sidewall means at two pivot locations disposed outside of the receptacle;

c) said sidewall connecting means including at least one connecting member and cover actuating means, and being effective to freely move said cover portion independent of said top peripheral edge section between a closed top position and an open top position;

d) said connecting member having two ends and being fixedly mounted at one end thereof to said cover portion, and said being pivotally connected at the other end thereof to said sidewall means at a first of said two pivot locations which are downwardly spaced from said peripheral edge section;

e) said cover actuating means including an upper end section and a lower end section; said upper end section being pivotally mounted to said connecting member at an upper pivot axis, and said lower end section being pivotally mounted to said sidewall means at a lower pivot location disposed at a second of said two pivot locations; said lower pivot location being spaced downwardly and outwardly from said first of said pivot locations and said sidewall means;

f) said cover actuating means being effective to move between an extended position and a retracted position wherein said cover portion is in said closed top position when said cover actuating means is in said extended position, and the cover portion is in said open top position when said cover actuating means is in said retracted position; and g) mobile base means for supporting said container along said bottom portion so that the container is movable from a bulk material collecting and transport position to an unloading position.

24. The container assembly as defined in claim 23 wherein
said mobile base means includes a structural configuration comprising a wagon, flat bed vehicle, trailer, dump truck, semitrailer, or railroad car.

25. The container assembly as defined in claim 23 wherein
said bottom portion including means for discharging bulk material contents from the receptacle at said unloading position.

26. The container assembly as defined in claim 23 wherein
said sidewall means includes a pivot location housing means that projects inwardly along an inside surface of the receptacle, and
said first of said two pivot locations is laterally spaced inwardly with respect to an outside surface of the sidewall means within said pivot location housing means.

27. The container assembly as defined in claim 23 wherein
said cover portion has an inner surface against which inner cover surface said bulk material is disposed when piled to a level above the top peripheral edge section of said container,
said cover actuating means produces a leveraged force in an amount sufficient to compress said piled bulk material disposed in said receptacle when said cover actuating means moves the cover portion from said open position to said closed position.

28. The container assembly as defined in claim 27 wherein
said cover portion has an outer apron section extending along an outer free distal edge of a top cover section which is mounted to said sidewall connecting means along a cover connecting edge section that is opposite said outer apron section,
said outer apron section being inclined downwardly with respect to said top cover section, and having a breadth and being disposed at an angle sufficient to maintain the bulk material within the receptacle when the cover portion causes the bulk material to move toward said outer free distal edge of the top cover section as it moves to said closed top position.

29. The container assembly as defined in claim 23 wherein
said sidewall means includes a planar sidewall portion,
said sidewall connecting means includes at least two connecting members laterally spaced along said planar sidewall portion, and
said cover actuating means includes cover actuation mechanisms each having two ends and being connected at one end thereof to respective one of connecting member, and at the other end thereof to pivot locations which are spaced outwardly from said planar sidewall portion.

30. The container assembly as defined in claim 29 wherein
said cover portion includes an inner cover surface that becomes separated a spaced distance from the top edge section to form a gap extending the length of said planar sidewall portion when the cover portion is said open top position to receive bulk material into said receptacle,
barrier means spaced inwardly from said planar sidewall portion for deflecting bulk material into the receptacle that forcefully impinges against the inner cover surface from a location outside the container,
said barrier means extending downwardly from said inner cover surface by an amount sufficient to preclude the discharge of bulk material through the spaced distance of the gap along said length of said planar sidewall portion when the bulk material is directed into said receptacle.

31. The container assembly as defined in claim 30 wherein
said barrier means is fixedly attached to and extending downwardly from said inner cover surface.

32. The container assembly as defined in claim 30 wherein
said barrier means is pivotally and slidably attached along an upper side edge thereof to the inner cover surface at a location which is inwardly spaced from said top peripheral edge section,
said barrier means extending downwardly from the inner cover surface and being pivotally attached along a lower side edge thereof to said top peripheral edge section.

33. The container assembly as defined in claim 32 wherein
said barrier means includes hinge means that pivotally couples said lower side edge of the barrier means to the top peripheral edge section.

34. The container assembly as defined in claim 23 wherein
said cover portion includes a downwardly extending section having a distal end portion pivotally connected at a cover pivot location defining the first of the two pivot locations downwardly spaced from said top peripheral edge section, said cover actuating means having first and second end sections corresponding to the upper and lower end sections respectively with said first end section pivotally mounted to said downwardly extending section of the cover portion at an upper actuating pivot axis corresponding to the upper pivot axis, and said second end section pivotally mounted at a lower actuating pivot axis corresponding to the lower pivot location and that is spaced downwardly from said top peripheral edge section.

35. The container assembly as defined in claim 34 wherein said distal end portion of said downwardly extending section includes said at least one connecting member having a distal end pivotally mounted to said cover pivot axis location, and said lower actuating pivot axis of the second end section of the cover actuating means is spaced downwardly from said cover pivot location.

36. The container assembly as defined in claim 34 wherein said distal end portion of said downwardly extending section includes bracket means rigidly connected to a cover section of said cover portion, and said at least one connecting member being rigidly connected at said one end thereof to said bracket means, said connecting member is pivotally connected at the other end thereof to a cover pivot axis disposed at said cover pivot axis location for said downwardly extending section, said upper actuating pivot of the cover actuating means is disposed at an intermediate location between the cover section and said cover pivot location of said downwardly extending section, and said lower actuating pivot axis of the cover actuating means is spaced downwardly from said cover pivot location.

37. The container assembly as defined in claim 34 wherein said cover pivot location of said downwardly extending section is disposed in a first vertically disposed plane, and said lower actuating pivot axis of the cover actuating means is disposed in a second vertically disposed plane that is parallel to the first vertically disposed plane, and laterally spaced outwardly from said sidewall means and said first vertically disposed plane.

38. The container assembly as defined in claim 23 wherein said cover actuating means is effective to move between an extended position and a retracted position wherein said cover portion is in said closed top position when said cover actuating means is in said extended position, and said cover portion is said open top position when said cover actuating means is in said retracted position.

39. The container assembly as defined in claim 38 wherein said cover actuating means includes hydraulically driven piston means to effect said movement between said extended and retracted positions.

40. The container assembly as defined in claim 23 wherein sealing means is disposed between said cover portion and said upwardly facing top peripheral edge section when said cover portion is in said closed top position.

41. The container assembly as defined in claim 23 wherein said sidewall means comprises a plurality of planar sidewall portions including container end planar sidewall portions, and said cover portion includes at least one end wall means for preventing bulk material from being discharged over one of said container end planar sidewall portions of the sidewall means while the receptacle is being loaded with the bulk material from a loading location outside the receptacle and disposed a spaced distance away from said sidewall means.

* * * * *